July 21 1925. S. OTIS 1,546,939
PIPING FOR LOCOMOTIVE ROUNDHOUSES
Filed April 20, 1923 2 Sheets-Sheet 1
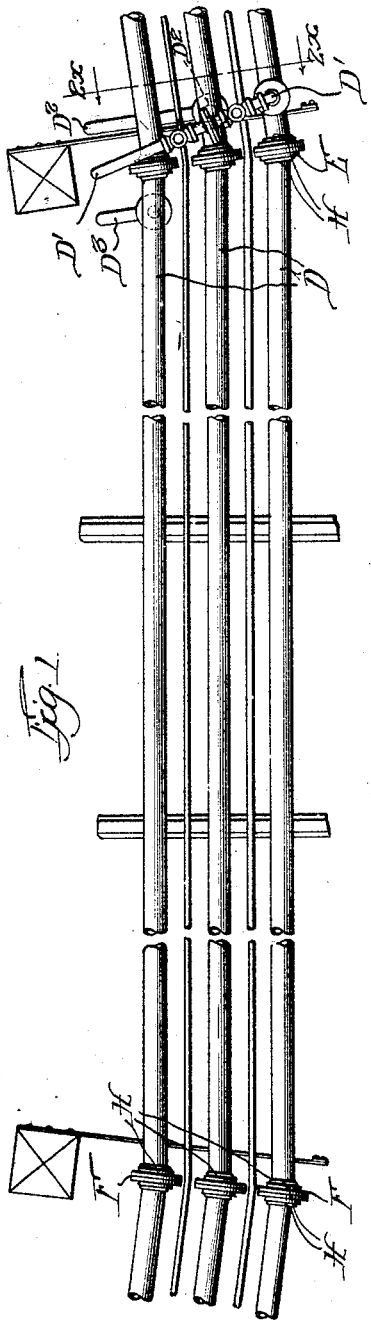
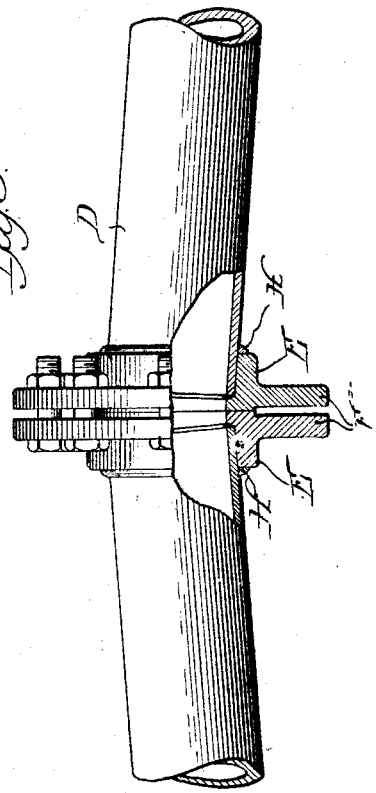

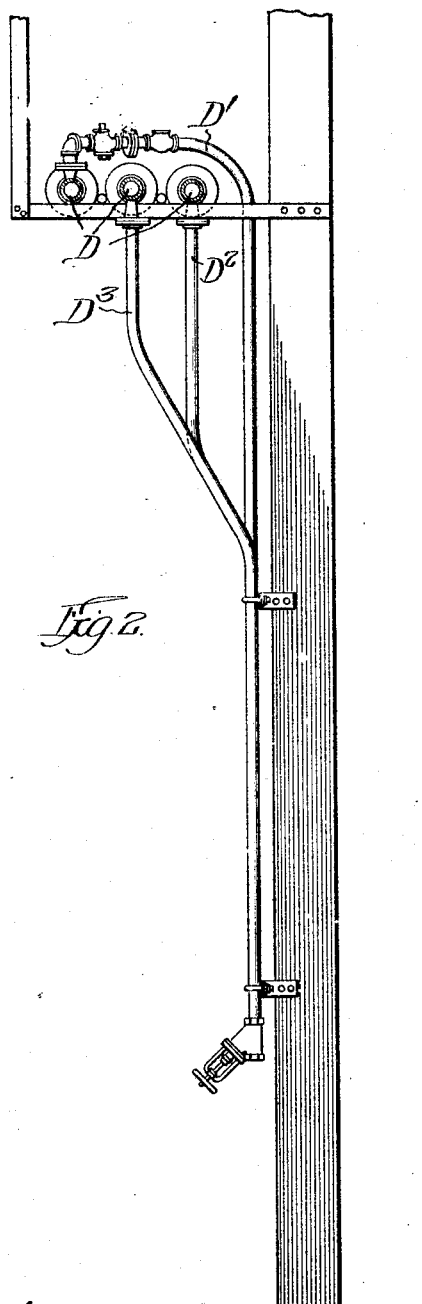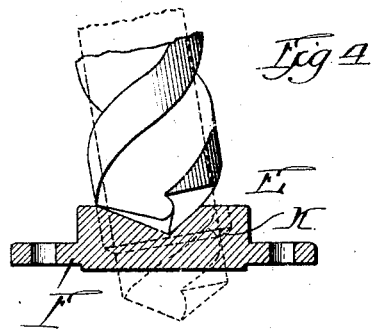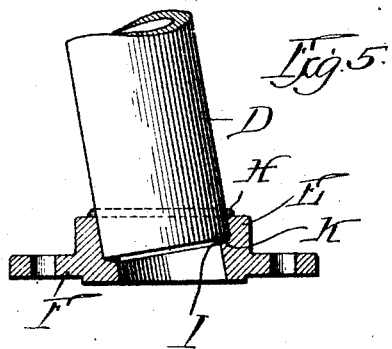

Patented July 21, 1925.

1,546,939

UNITED STATES PATENT OFFICE.

SPENCER OTIS, OF BARRINGTON, ILLINOIS.

PIPING FOR LOCOMOTIVE ROUNDHOUSES.

Application filed April 20, 1923. Serial No. 633,344.

*To all whom it may concern:*

Be it known that I, SPENCER OTIS, a citizen of the United States, residing at Barrington, in the county of Cook and State of Illinois, have invented certain new and useful Improvements in Piping for Locomotive Roundhouses, of which the following is a specification.

This invention relates to piping for locomotive roundhouses, and particularly roundhouses in connection with which boiler washing systems are used, so that it becomes necessary to provide for distribution of blown off products of locomotives and wash-out and refilling water for the same.

In boiler washing systems, it is the practice to bend or curve the distributing pipes or mains so that they can be arranged as chords of a circle within the roundhouse, and with leads extending therefrom to points within convenient reach of the operatives when attending the engine to be cleaned and refilled, the mains being preferably suspended overhead and the leads being taken off in the form of depending pipes, commonly called drops, extending to the respective stations between the tracks of the radiating series of stalls. In systems of this kind it has proven expensive to curve the pipe and very difficult to make quick and satisfactory couplings between the sections, owing to the necessity of arranging them in accurate relation, the difficulty of threading together the pipes and unions, the unavoidable strains imposed upon the pipes at their weakened threaded ends during the manipulation incident to assembly, and in assembling angular flanged pipe great difficulty arises in case of the slightest deviation in the rotary adjustment of the angular coupling when screwed on.

The present invention seeks to overcome the objections above enumerated and provide for convenient, quick, economical, and durable assembly of the sections of the mains by providing means which will insure accurate joining of the pipes in the precise relation desired, and will resist any tendency to injure the joint through careless handling of the pipe, by making the portion of the pipe at the joint as strong or stronger than the main body thereof. Accordingly, the invention proceeds upon the principle of providing upon the meeting ends of the pipe sections coupling members, preferably in the form of flanged coupling members, into which pipes are introduced, at an angle to the axis of the coupling member, which, by the abutment of two such couplings, develops between two adjoining pipe sections the exact angle of the polygon of which the system of piping is to form a part; the pipes being secured in their said couplings without the usual threading that reduces the wall section of the pipe and tends to arrest the coupling at the two ends of the pipe at improper angles of revolution with relation to the pipe; and the couplings being secured immovably to the ends of the pipe, by shrinking on and also by electrically welding the joints between them. The flange coupling members are preferably drop forgings and are formed with their cylindrical or equivalent body portions in normal relation or coaxial with their flanges, the bores for receiving the rear ends being drilled or cut therein upon an axis standing at an angle to the axis of the coupling member, and being formed therein with two diameters, namely, a major diameter which adapts the coupling to snugly fit and grip upon the pipe when shrunk thereon, and a minor diameter sufficiently less than the major diameter to provide a shoulder against which the inner end of the pipe may abut and between which and the end of pipe the welding fillet may be electrically deposited. The welding is preferably carried on in a manner to fill out any recess left at the end of the pipe as a result of the divergence of the axis of the pipe from the axis of the coupling member, and thus insure a smooth and continuous bore of the resultant water main and freedom from pockets or shoulders that might accumulate sediment or impurities.

In the accompanying drawing—

Figure 1 is a plan view of a portion of the pipes of a locomotive roundhouse or boiler washing system with which the same is equipped, and in which the subject-matter of the present invention is embodied.

Figure 2 is a section on the line 2ˣ—2ˣ of Figure 1.

Figure 3 is a detail view on an enlarged scale, and partly in section, of a joint constructed in accordance with the present invention.

Figure 4 is a view representing the preferred method of forming the seat in the coupling member; and Figure 5 is a view showing the pipe in the seat.

D represents portions of the distributing pipes of a boiler washing system, equipped at each station with drops D′, D², D³, as shown more clearly in Figure 2.

In order to fit the pipes D in place with accuracy, security, convenience, and economy, each pipe is provided with a coupling member E preferably with a flange F to receive bolts G, and the pipe D is closely fitted into a smooth bore of the coupling member at such an angle to the axis thereof as will cause two pipes when joined by such coupling to develop precisely the angle of the polygon of which the pipe system is to form a part, or assume exactly whatever angular relation it is necessary to give to the pipes in developing the system of distribution. In order to firmly secure the pipes D in their coupling members E, the ends of the pipes are preferably welded to the coupling members in the manner suggested in Figure 3, so that there will be built up at the ends of the pipes, within the coupling members, fillets of electrically fused metal H and I. This process will preferably be carried on in a manner to fill out any recess between the end of the pipe and the shoulder of the coupling against which it abuts, thereby avoiding any pockets or space for the accumulation of impurities that would develop obstruction or favor the corrosive action of the water upon the metal of the coupling. Inasmuch as the metal of the fillets H and I is of particular purity, this method of facing the joint will greatly improve the joint and lend additional insurance against leakage.

It has heretofore been proposed to cast flange coupling members with cylindrical body portions formed about an axis that is at the desired angle to the axis of the flange member, and to thread the end of the pipe therein. This virtually limits production to a casting operation, impairs its security by cutting the threads in the pipe, and adds greatly to the time and inconvenience of assembling, particularly in a regular polygonal assembly of distribution pipes, and is objectionable for other reasons. According to the present invention, the coupling members are drop forged, and then drilled or cut in a lathe to provide a seat or pipe receiving opening with its axis at an angle to the axis of the flange portion of the member, as suggested in Figure 4, the opening being made by two different cuts, one of which is upon a major diameter that snugly fits the end of the pipe when introduced, and the other of which is on a lesser diameter sufficient to leave a shoulder K which receives the end of the pipe. If the holes are drilled, the shoulder naturally has a wall inclined to the end of the pipe, but this is not objectionable inasmuch as it provides a recess to receive the fillet I of electrically deposited iron, and thereby better secures the pipe and coupling member together. In applying the coupling members to the end of the pipe, the pipe will preferably be supported in a jig or apparatus adapted to hold it at an exact angle, and having means whereby the flange will be embraced and held at the exact relative angle, the flange thus applied at one end being thereafter utilized to insure the exact rotary position of the pipe when receiving the coupling member upon its opposite end.

With pipes equipped as above described, it becomes merely necessary to move each pipe to the position which it is to assume, as, for instance, by raising it through block and tackle to its elevated position, and there bolt its end to the corresponding end of a previously positioned pipe in order to insure the accurate positioning of each pipe both as to horizontal angle and angle of rotation, and since all of the fittings are made on a common standard, the ends will go together with certainty and exactness, and minimum requirement of skilled labor.

This application is a continuation in part of application Serial No. 431,920, filed December 20, 1920.

I claim:

1. In an angular pipe coupling, a pipe member constructed with a smooth end terminating in a plane substantially perpendicular to the axis of the pipe, a flange member constructed with an abutting face and with a smooth cylindrical bore generated about an axis at a substantial angle to the perpendicular to the abutting face and adapted to permit the pipe end to slide axially into it, to a desired limit of penetration, at any relative angle of revolution between the members and to permit the flange member after the pipe reaches its limit of penetration to rotate upon the end of the pipe without altering the degree of penetration or the angular relation between the axis of the pipe and the plane of the abutting face, and means integrally bonding said members into an erectable unit.

2. In an angular pipe coupling, a pipe member constructed with a smooth end terminating in a plane substantially perpendicular to the axis of the pipe, a flange member constructed with an abutting face and with a smooth cylindrical recess generated about an axis at a substantial angle to the perpendicular to the abutting face and terminating short of said abutting face, said recess being constructed to permit the pipe end to slide axially into it, to the depth of said recess, at any relative angle of revolution between the members, and to permit the flange member to rotate upon the end of the pipe without altering the longitudinal relation of the members or the angular relation between the axis of the pipe and the plane of the abutting face, and means integrally bonding said members into an erectable unit.

Signed at Chicago, Illinois, this 6th day of April, 1923.

SPENCER OTIS.